United States Patent
Takehara et al.

(10) Patent No.: US 11,919,567 B2
(45) Date of Patent: Mar. 5, 2024

(54) AUTOMATIC STEERING CONTROL APPARATUS

(71) Applicant: SUBARU CORPORATION, Tokyo (JP)

(72) Inventors: Yuki Takehara, Tokyo (JP); Hidenori Yakuwa, Tokyo (JP); Keisuke Motegi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 83 days.

(21) Appl. No.: 17/493,662

(22) Filed: Oct. 4, 2021

(65) Prior Publication Data

US 2023/0109155 A1 Apr. 6, 2023
US 2023/0415814 A9 Dec. 28, 2023

(30) Foreign Application Priority Data

Oct. 2, 2020 (JP) .................................. 2020-168084

(51) Int. Cl.
   *B62D 15/02* (2006.01)
(52) U.S. Cl.
   CPC .................................. *B62D 15/025* (2013.01)
(58) Field of Classification Search
   CPC .......................... G06Q 10/047; G08G 1/0967
   See application file for complete search history.

(56) References Cited

U.S. PATENT DOCUMENTS

| | | | | |
|---|---|---|---|---|
| 2018/0281789 | A1* | 10/2018 | Oyama | G05D 1/0251 |
| 2019/0241184 | A1* | 8/2019 | Hayashi | G08G 1/167 |
| 2021/0117698 | A1* | 4/2021 | Horinaga | H04N 7/18 |
| 2022/0219692 | A1* | 7/2022 | Taniguchi | B60W 50/082 |
| 2022/0314984 | A1* | 10/2022 | Takahashi | B60W 30/12 |

FOREIGN PATENT DOCUMENTS

JP   2015-058903 A   3/2015

* cited by examiner

*Primary Examiner* — Jeff A Burke
*Assistant Examiner* — Jerrod Irvin Davis
(74) *Attorney, Agent, or Firm* — TROUTMAN PEPPER HAMILTON SANDERS LLP

(57) ABSTRACT

An automatic steering control apparatus includes a lane line detector, a shape data detector, a traveling processor, and a steering angle processor. The lane line detector is configured to detect right and left lane lines. The shape data detector is configured to detect shape data. The traveling processor is configured to, in a case where both the lane lines are detected, execute a first lane-line control that is an automatic steering control to be executed on the basis of both the lane lines, and configured to, in a case where only one of the lane lines is detected as a detected lane line, execute a determining process that compares data on the detected lane line and the shape data and that determines whether to execute a second lane-line control that is the automatic steering control to be executed on the basis of only the one of the lane lines.

14 Claims, 11 Drawing Sheets

AUTOMATIC STEERING CONTROL APPARATUS

CROSS-REFERENCE TO RELATED APPLICATION

The present application claims priority from Japanese Patent Application No. 2020-168084 filed on Oct. 2, 2020, the entire contents of which are hereby incorporated by reference.

BACKGROUND

The technology relates to an automatic steering control apparatus configured to perform an automatic steering control that causes a vehicle to travel along a target traveling path.

An automatic driving control apparatus and a driving assist apparatus that utilize an automatic driving technique have been developed and put into practical use for a vehicle in recent years. An automatic steering control apparatus is an example of such apparatuses. The automatic steering control apparatus controls a steering angle of a vehicle to execute an automatic steering control that causes the vehicle to travel along a target traveling path. The automatic steering control sets target positions of the vehicle on the basis of, for example, a result of recognition of a lane obtained from a camera mounted on the vehicle, and so controls the steering angle of the vehicle as to cause the vehicle to travel along a trajectory of the target positions.

The automatic steering control apparatus sets the target positions of the vehicle to the middle of the lane, or a traveling lane, to execute a lane keep control that causes the own vehicle to travel along the lane. Such an automatic steering control apparatus is disclosed in Japanese Unexamined Patent Application Publication (JP-A) No. 2015-058903, for example. JP-A No. 2015-058903 discloses a technique that recognizes right and left lane lines of a lane on the basis of an image captured by a charge-coupled device (CCD) camera, and so controls a vehicle as to cause the vehicle to travel along a target course set in the middle of the right lane line and the left lane line.

SUMMARY

An aspect of the technology provides an automatic steering control apparatus configured to perform an automatic steering control that causes a vehicle to travel along a target traveling path. The automatic steering control apparatus includes a lane line detector, a shape data detector, a traveling processor, and a steering angle processor. The lane line detector is configured to detect right and left lane lines that define a lane along which the vehicle travels. The shape data detector is configured to detect shape data, in which the shape data has a corresponding relationship with a road shape of the lane and excludes the right and the left lane lines. The traveling processor is configured to execute a traveling control that controls a traveling state of the vehicle. The steering angle processor is configured to control a steering angle of the vehicle on the basis of a command signal from the traveling processor. The traveling processor is configured to, in a case where both the right and the left lane lines are detected by the lane line detector, execute a first lane-line control, in which the first lane-line control is the automatic steering control to be executed on the basis of both the right and the left lane lines. The traveling processor is configured to, in a case where only one of the right and the left lane lines is detected by the lane line detector as a detected lane line, execute a determining process that compares data on the detected lane line and the shape data and that determines whether to execute a second lane-line control, in which the second lane-line control is the automatic steering control to be executed on the basis of only the one of the right and the left lane lines.

An aspect of the technology provides an automatic steering control apparatus configured to perform an automatic steering control that causes a vehicle to travel along a target traveling path. The automatic steering control apparatus includes circuitry, a traveling processor, and a steering angle processor. The circuitry is configured to detect right and left lane lines that define a lane along which the vehicle travels, and detect shape data, in which the shape data has a corresponding relationship with a road shape of the lane and excludes the right and the left lane lines. The traveling processor is configured to execute a traveling control that controls a traveling state of the vehicle. The steering angle processor is configured to control a steering angle of the vehicle on the basis of a command signal from the traveling processor. The traveling processor is configured to, in a case where both the right and the left lane lines are detected by the circuitry, execute a first lane-line control, in which the first lane-line control is the automatic steering control to be executed on the basis of both the right and the left lane lines. The traveling processor is configured to, in a case where only one of the right and the left lane lines is detected by the circuitry as a detected lane line, execute a determining process that compares data on the detected lane line and the shape data and that determines whether to execute a second lane-line control, in which the second lane-line control is the automatic steering control to be executed on the basis of only the one of the right and the left lane lines.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
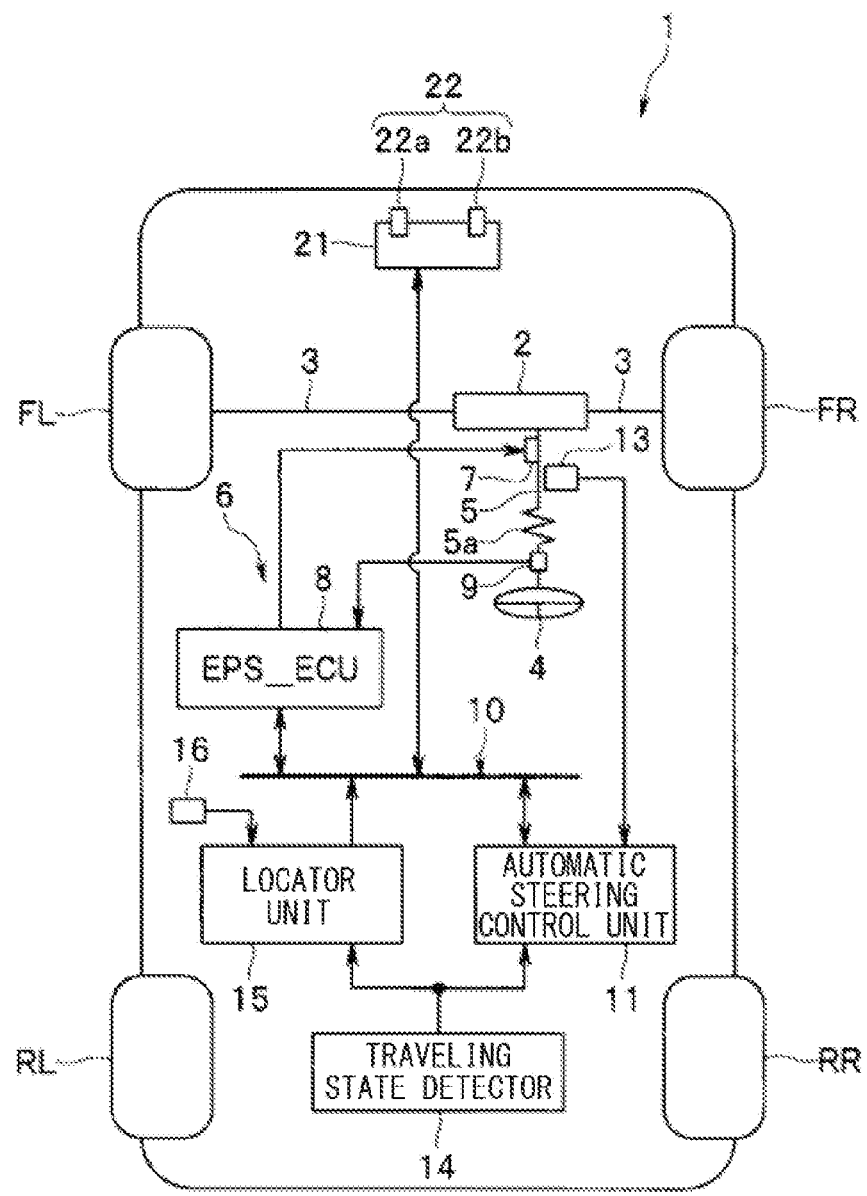
FIG. 1 is a diagram illustrating a schematic configuration of a vehicle mounted with an automatic steering control apparatus according to one example embodiment of the technology.

A lane keep control controls a vehicle on the basis of right and left lane lines. It is possible to continue the lane keep control in a case where one of the right and the left lane lines is no longer detectable during the lane keep control, by using detected one of the lane lines and a road width. The road width is calculated on the basis of the right and the lane lines that have been detected until then. However, it has not been possible to identify a shape of a lane in a case where only one of the right and the left lane lines is detected, under a situation where the lane keep control is turned off. In such a case, it has not been possible to start the lane keep control accordingly.

It is desirable to provide an automatic steering control apparatus that makes it possible to execute an automatic steering control even in a case where only one of right and left lane lines is detected.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First, a description is given, with reference to FIG. 1, of a schematic configuration of a vehicle mounted with an automatic steering control apparatus according to a first example embodiment of the technology. Referring to FIG. 1, the vehicle 1 may include a left front wheel FL, a right front wheel FR, a left rear wheel RL, and a right rear wheel RR. In the following, described is an example in which the left front wheel FL and the right front wheel FR serve both as drive wheels and steer wheels.

The vehicle 1 may also include a steering mechanism 2 such as a rack-and-pinion mechanism. The steering mechanism 2 may be coupled to the left front wheel FL and the right front wheel FR via a tie rod 3, and may also be coupled to a steering shaft 5. The steering shaft 5 may have a steering wheel 4 fixed to an end of the steering shaft 5. The left front wheel FL and the right front wheel FR may be turned in right and left directions via the steering mechanism 2 in response to an operation of the steering wheel 4 performed by a driver.

The vehicle 1 may further include an electronic power steering device (hereinafter referred to as an "EPS device") 6. The EPS device 6 may include an electronic power steering motor (hereinafter referred to as an "EPS motor") 7 and an electronic power steering control unit (hereinafter referred to as an "EPS control unit") 8. It should be noted that the EPS control unit is denoted as "EPS ECU" in FIG. 1. The EPS motor 7 may be coupled to the steering shaft 5 via an unillustrated transmission mechanism.

The vehicle 1 may further include a steering torque sensor 9. The steering torque sensor 9 may detect a steering torque to be applied to the steering wheel 4 by the driver, on the basis of a twist angle of a torsion bar 5a inserted at the steering shaft 5. The steering torque sensor 9 may be coupled to the EPS control unit 8.

The EPS control unit 8 may set an assist torque that assists the steering torque to be applied by the driver, on the basis of results of detection obtained from, for example, the steering torque sensor 9 and a later-described vehicle speed sensor. The EPS control unit 8 may so control the EPS motor 7 as to allow the thus-set assist torque to be applied to the steering shaft 5.

The vehicle 1 may further include an automatic steering control unit 11, a locator unit 15, and a camera unit 21. The EPS control unit 8, the automatic steering control unit 11, the locator unit 15, and the camera unit 21 may be coupled to an in-vehicle network 10 such as a controller area network (CAN). The in-vehicle network 10 may be coupled to an unillustrated plurality of electronic control units that controls a traveling state of the vehicle 1, including, for example, an engine control unit, a transmission control unit, and a brake control unit.

The automatic steering control unit 11 may be a processor of the automatic steering control apparatus configured to perform an automatic steering control that causes the vehicle 1 to travel along a target traveling path. Upon execution of the automatic steering control, the automatic steering control unit 11 may set a target torque on the basis of a target steering angle of the vehicle 1 and send, to the EPS control unit 8, a command signal corresponding to the thus-set target torque. The EPS control unit 8 may so control the EPS motor 7 as to allow the thus-set target torque to be applied to the steering shaft 5, on the basis of the received command signal.

The automatic steering control unit 11 may be coupled to: a steering angle sensor 13 that detects a steering angle and a steering direction of the vehicle 1; and a traveling state detector 14 that detects data on the traveling state of the vehicle 1. The locator unit 15 may be coupled to the traveling state detector 14 and a global navigation satellite system (GNSS) receiver 16 that receives a positioning signal transmitted from a plurality of positioning satellites. The traveling state detector 14 may include a plurality of sensors, including, for example: a vehicle speed sensor 14A that detects a vehicle speed of the vehicle 1; an acceleration sensor 14B that detects acceleration in front, rear, right, and left directions of the vehicle 1; and a gyroscope sensor 14C that detects an angular velocity or angular acceleration of the vehicle 1.

The automatic steering control unit 11 may execute the automatic steering control in a case where, for example, an operation performed by the driver of turning on a switch of the automatic steering control is detected. The automatic steering control unit 11 may release the automatic steering control in a case where a predetermined driving operation, such as a steering wheel operation, performed by the driver is detected. The automatic steering control unit 11 may release the automatic steering control in a case where an operation of a release switch of the automatic steering control is detected. It should be appreciated that a positive and a negative of each of the steering angle, the steering torque, the assist torque, and the target torque of the vehicle 1 may be defined by whether the vehicle 1 turns in a left direction or turns in a right direction.

Figure 2:
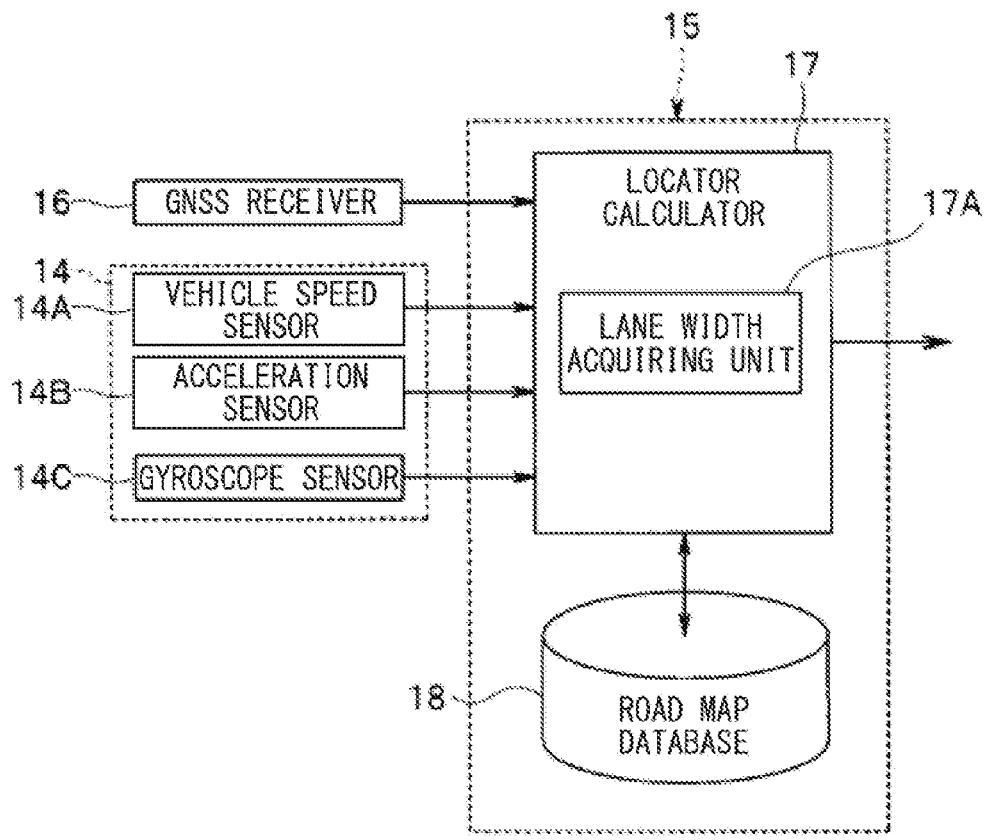
FIG. 2 is a block diagram illustrating a configuration of a locator unit according to one example embodiment of the technology.

The locator unit 15 may estimate a position of the own vehicle 1, or an own vehicle position, on a road map. Described now, with reference to FIG. 2, is a configuration of the locator unit 15. FIG. 2 is a block diagram illustrating a configuration of the locator unit 15. The locator unit 15 may include a locator calculator 17 that estimates the own vehicle position. The locator calculator 17 may be coupled to the traveling state detector 14 and the GNSS receiver 16.

The locator unit 15 may further be coupled to a storage medium that is coupled to the locator calculator 17 and in which high-accuracy road map data, or a dynamic map, is stored. Hereinafter, the storage medium is referred to as a road map database 18. The road map database 18 may be configured by a large-capacity storage medium such as a hard disk drive (HDD). The road map database 18 may include lane data necessary for performing automatic driving. Non-limiting examples of the lane data may include: a road type such as a general road, a mountain road, a freeway, and a running road for competition; lane width data; lane middle position coordinate data, a traveling azimuth data of a lane; and a speed limit.

The locator calculator 17 may acquire, from the map data stored in the road map database 18, route map data related to a route from a current location to a destination on the basis of the destination set by the driver, for example. The locator calculator 17 may also acquire coordinates of position of the vehicle 1 on the basis of the positioning signal received by the GNSS receiver 16. The locator calculator 17 may perform map matching of the thus-acquired coordinates of position on the route map data to estimate the own vehicle position on the road map and identify a traveling lane.

In some embodiments, the locator calculator 17 may include a lane width acquiring unit 17A that acquires data on a width of a lane along which the vehicle 1 travels. The lane width acquiring unit 17A may acquire, from the road map database 18, a lane width of the traveling lane identified as described above.

Figure 3:
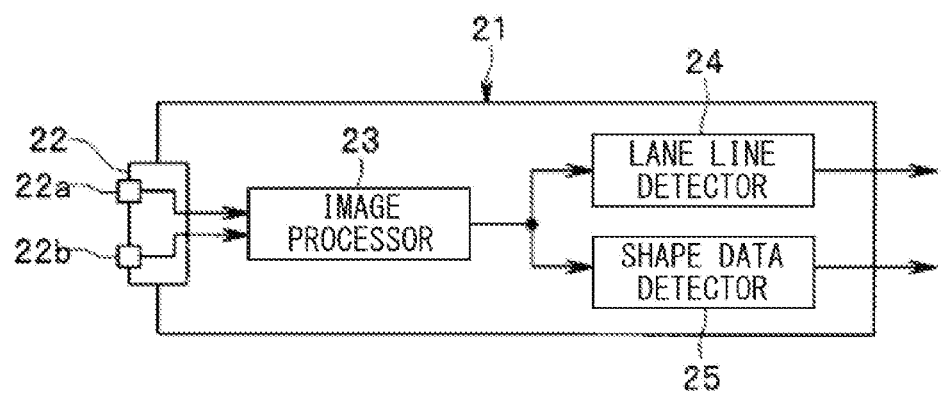
FIG. 3 is a block diagram illustrating a configuration of a camera unit according to one example embodiment of the technology.

The camera unit 21 may recognize an external environment of the vehicle 1. Described now in detail, with reference to FIGS. 1 and 3, is a configuration of the camera unit 21. FIG. 3 is a block diagram illustrating a configuration of the camera unit 21. The camera unit 21 includes a lane line detector 24 and a shape data detector 25. The camera unit 21 may also include a vehicle-mounted camera 22 and an image processor 23. The vehicle-mounted camera 22 may include a stereo camera having a main camera 22a and a sub camera 22b.

The main camera 22a and the sub camera 22b may be disposed in the vicinity of a windshield inside a vehicle compartment, for example. The main camera 22a and the sub camera 22b may be disposed at a predetermined interval from the middle in a vehicle width direction, for example. The main camera 22a and the sub camera 22b each may include an imaging device such as a charge-coupled device (CCD) or a complementary metal-oxide semiconductor (CMOS). The imaging device may capture an image of a traveling environment ahead of the vehicle 1 in a traveling direction in which the vehicle 1 travels.

The image processor 23 may convert a pair of analog images captured by the main camera 22a and the sub camera 22b into digital images each having a predetermined luminance gradation. The image processor 23 may also generate reference image data on the basis of the image captured by the main camera 22a, and comparison image data on the basis of the image captured by the sub camera 22b. The image processor 23 may calculate distance data on a distance from the vehicle 1 to a target object, on the basis of a difference between the reference image data and the comparison image data.

The lane line detector 24 is configured to detect right and left lane lines that define a lane along which the vehicle 1 travels. For example, the lane line detector 24 may recognize the lane lines provided on both right and left sides of the lane along which the vehicle 1 travels. Further, the lane line detector 24 may calculate, on the basis of a result of the recognition of the lane lines: a lateral position of the vehicle 1 as a position in the vehicle width direction of the vehicle 1; a target lateral position; a curvature of the lane along which the vehicle 1 travels (hereinafter referred to as a "lane curvature"); and a yaw angle of the vehicle 1 relative to the lane (hereinafter referred to as a "to-lane yaw angle"). The target lateral position may be the middle of the lane defined by the right and the left lane lines, for example.

The lane line detector 24 may calculate the lane curvature on the basis of an example method described below. First, the lane line detector 24 may generate a virtual road plane on the basis of the reference image data and the comparison image data. Thereafter, the lane line detector 24 may perform plotting of inner edges of the right and the left lane lines on the thus-generated virtual road plane. Thereafter, the lane line detector 24 may calculate curvatures of the right and the left inner edges. Thereafter, the lane line detector 24 may calculate the lane curvature, on the basis of the curvatures of the right and the left inner edges.

The shape data detector 25 is configured to detect shape data on the basis of the image of the traveling environment. The shape data has a corresponding relationship with a road shape of the lane along which the vehicle 1 travels, and excludes the right and the left lane lines. In some embodiments, the shape data may include data on an element extending along the lane. In some embodiments, the shape data may include one or more of: data on a curbstone that is adjacent to the lane; data on a road end of a road that includes the lane; and data having a corresponding relationship with an adjacent lane that is adjacent to the lane.

The EPS control unit 8, the automatic steering control unit 11, the locator unit 15 (excluding the road map database 18), and the camera unit 21 (excluding the main camera 22a and the sub camera 22b) each may be or include a microcomputer, for example. The microcomputer may include, for example, a central processing unit (CPU), a read-only memory (ROM), and a random-access memory (RAM). The ROM may contain a control program that achieves an operation set for each system. The CPU may read the control program from the ROM and execute the control program to achieve the operations of the EPS control unit 8, the automatic steering control unit 11, the locator unit 15, and the camera unit 21.

Figure 4:
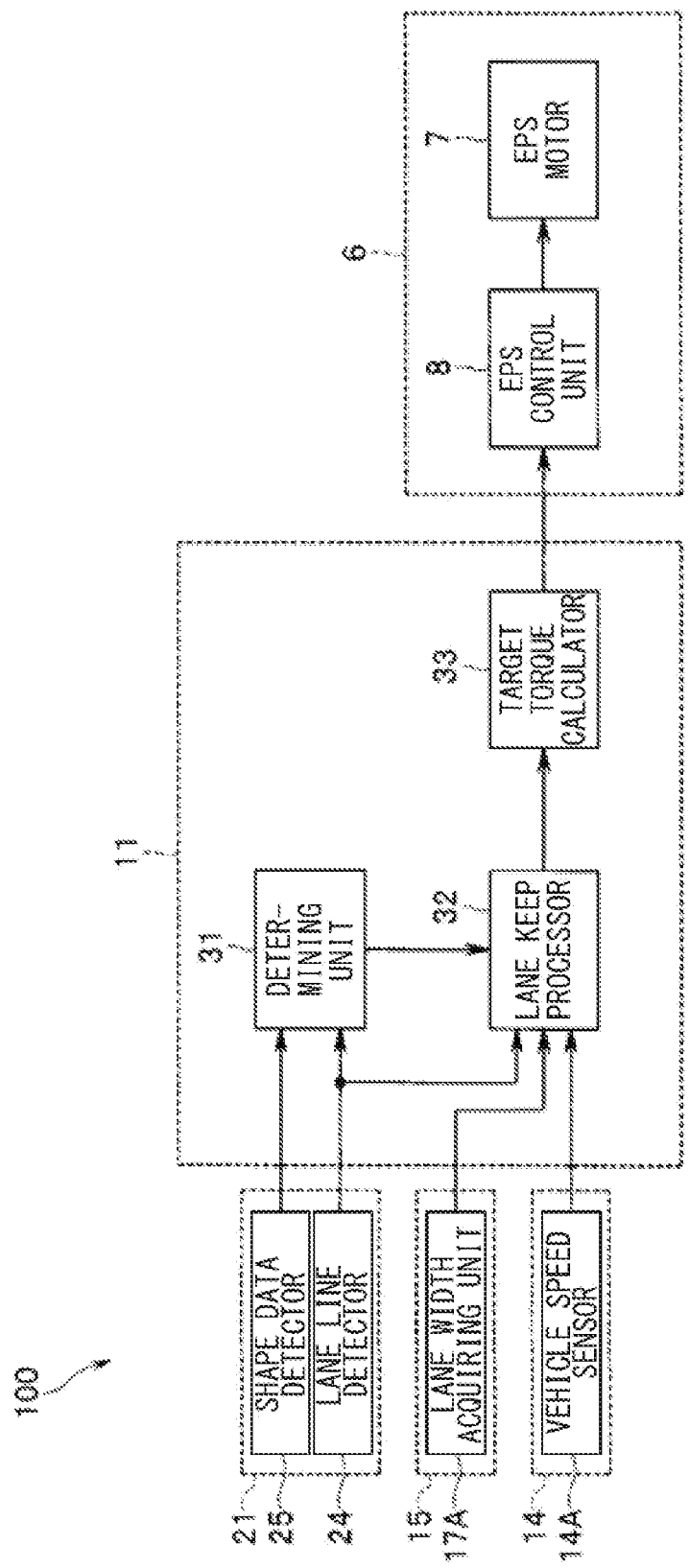
FIG. 4 is a block diagram illustrating a configuration of a part of the automatic steering control apparatus according to one example embodiment of the technology.

Next, a description is given, with reference to FIG. 4, of a configuration of the automatic steering control apparatus 100 according to an example embodiment. FIG. 4 is a block diagram illustrating a configuration of a part of the automatic steering control apparatus 100. The automatic steering control apparatus 100 includes a traveling control device. The automatic steering control apparatus 100 may also include the locator unit 15 and the camera unit 21. In one embodiment, the locator unit 15 may serve as a "road data acquiring unit". In one embodiment, the camera unit 21 may serve as an "external environment recognizer". The traveling control device includes a traveling processor and a steering angle processor. The traveling processor is configured to execute a traveling control that controls a traveling state of the vehicle 1. In some embodiments, the traveling processor may be configured by the automatic steering control unit 11. The steering angle processor is configured to control a steering angle of the vehicle 1 on the basis of a command signal from the traveling processor (e.g., the automatic steering control unit 11). In some embodiments, the steering angle processor may be configured by the EPS device 6.

The automatic steering control unit 11 is configured to execute a both-side-lane-line control and a one-side-lane-line control. The both-side-lane-line control is the automatic steering control to be executed on the basis of both the right and the left lane lines. The one-side-lane-line control is the automatic steering control to be executed on the basis of only one of the right and the left lane lines. In some embodiments, the automatic steering control may be a lane keep control that keeps the vehicle 1 within the lane.

The automatic steering control unit 11 may include a determining unit 31, a lane keep processor 32, and a target torque calculator 33. The determining unit 31 may acquire the data on the right and the left lane lines and the shape data on the basis of the lane line detector 24 and the shape data detector 25 of the camera unit 21. The determining unit 31 may determine whether to execute the lane keep control on the basis of the data on the right and the left lane lines and the shape data.

The lane keep processor 32 may execute the both-side-lane-line control and the one-side-lane-line control. In some embodiments, the lane keep processor 32 may acquire a result of the determination performed by the determining unit 31, and execute one of the both-side-lane-line control and the one-side-lane-line control as the lane keep control. In a case where the lane keep processor 32 executes the both-side-lane-line control, the lane keep processor 32 may acquire, from the lane line detector 24 of the camera unit 21, pieces of data of parameters including, for example, the lateral position of the vehicle 1, the target lateral position, the lane curvature, and the to-lane yaw angle. Further, the lane keep processor 32 may calculate a target position and an estimated position of the vehicle 1 at a predetermined position that is away in a forward direction from the vehicle 1 by a predetermined distance (a forward gazing distance), on the basis of the acquired pieces of data, the steering angle detected by the steering angle sensor 13, and the vehicle speed detected by the vehicle speed sensor 14A.

In a case where the lane keep processor 32 executes the one-side-lane-line control, the lane keep processor 32 may acquire data on one of the right and the left lane lines detected by the lane line detector 24 of the camera unit 21 (hereinafter referred to as a "detected lane line") and the data on the width of the lane. In some embodiments, the data on the width of the lane may be acquired from the lane width acquiring unit 17A of the locator calculator 17 of the locator unit 15. In some embodiments, the data on the width of the lane may be the data on the width of the lane calculated on the basis of the right and the left lane lines detected in the past. The lane keep processor 32 may calculate pieces of data of parameters including, for example, the lateral position of the vehicle 1, the target lateral position, the lane curvature, and the to-lane yaw angle on the basis of the data on the detected lane line and the data on the width of the lane. Further, the lane keep processor 32 may calculate the target position and the estimated position of the vehicle 1 at the predetermined position that is away in the forward direction from the vehicle 1 by the predetermined distance (the forward gazing distance), on the basis of the calculated pieces of data, the steering angle detected by the steering angle sensor 13, and the vehicle speed detected by the vehicle speed sensor 14A.

The lane keep processor 32 may so calculate the target steering angle of the vehicle 1 as to allow an absolute value of a deviation between the target position and the estimated position to be decreased. Described now is an example of a method of calculating the target steering angle. First, the lane keep processor 32 may calculate a first initial target steering angle that causes the vehicle 1 to traveling along the lane curvature. Thereafter, the lane keep processor 32 may calculate a second initial target steering angle that causes the to-lane yaw angle to be coincident with a predetermined target yaw angle. Thereafter, the lane keep processor 32 may calculate a lateral position deviation, and may calculate a third initial target steering angle that causes the lateral position deviation to be zero. The lateral position deviation may be a deviation in the vehicle width direction of the vehicle 1 from the target position to the estimated position. Thereafter, the lane keep processor 32 may calculate the sum of the first to the third initial target steering angle as the target steering angle.

The target torque calculator 33 may acquire the target steering angle from the lane keep processor 32. The target torque calculator 33 may calculate the target torque on the basis of the target steering angle and the steering angle detected by the steering angle sensor 13. The target torque may be a torque that allows the vehicle 1 to be turned in the automatic steering control (e.g., the lane keep control) and that is to be applied to the steering shaft 5 to allow the steering angle to be coincident with the target steering angle. The target torque calculator 33 may send the command signal having a corresponding relationship with the target torque to the EPS control unit 8 of the EPS device 6.

The EPS control unit 8 may receive the command signal corresponding to the target torque. The EPS control unit 8 may so control the EPS motor 7 as to allow the target torque described above to be applied to the steering shaft on the basis of the received command signal, thereby controlling the steering angle of the vehicle 1. It should be appreciated that the command signal to be received by the EPS control unit 8 may be any signal that results in the addition of the target torque to the steering shaft 5 consequently, and/or may be a signal that controls the steering angle.

Figure 5:
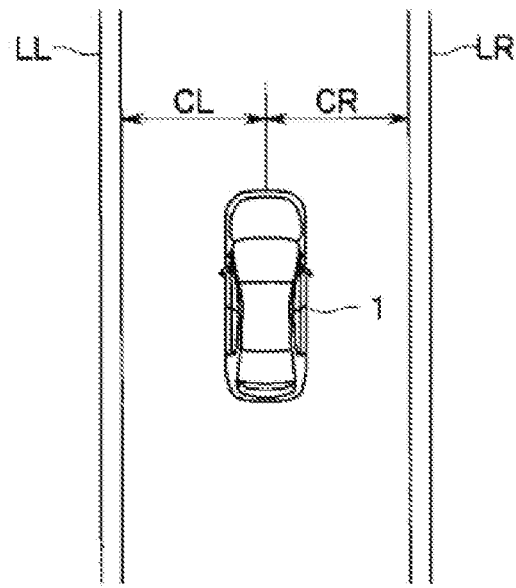
FIG. 5 is a diagram illustrating a both-side-lane-line control according to one example embodiment of the technology.

Next, a description is given of some examples of the one-side-lane-line control according to an example embodiment. Described first is an example of the both-side-lane-line control for a comparison purpose. FIG. 5 is a diagram illustrating the both-side-lane-line control. The both-side-lane-line control may detect a left lane line LL and a right lane line LR. It is possible to identify a shape of the lane by detecting the left lane line LL and right lane line LR. It is also possible to identify the lateral position of the vehicle 1 and the target lateral position by detecting the left lane line LL and right lane line LR. The lateral position of the vehicle 1 and the target lateral position may be calculated on the basis of a distance CL from the left lane line LL to the vehicle 1 and a distance CR from the right lane line LR to the vehicle 1.

Figure 6:
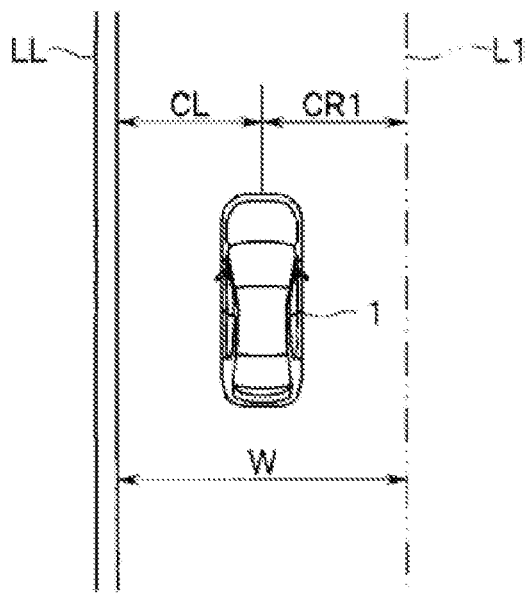
FIG. 6 is a diagram illustrating an example of a one-side-lane-line control according to one example embodiment of the technology.

FIG. 6 is a diagram illustrating a first example of the one-side-lane-line control. FIG. 6 illustrates a non-limiting example in which only the left lane line LL is detected as the detected lane line. The lane keep processor 32 in the one-side-lane-line control according to the first example may first acquire the data on the detected lane line from the lane line detector 24 of the camera unit 21. Thereafter, the lane keep processor 32 may acquire the data on a width W of the lane from the lane width acquiring unit 17A of the locator calculator 17 of the locator unit 15. Thereafter, the lane keep processor 32 may estimate a virtual curve line L1 that corresponds to the right lane line LR, on the basis of the left lane line LL and the width W of the lane. Thereafter, the lane keep processor 32 may identify the shape of the lane by assuming the virtual curve line L1 as the right lane line LR. In addition, the lane keep processor 32 may identify the lateral position of the vehicle 1 and the target lateral position by assuming the virtual curve line L1 as the right lane line LR. The one-side-lane-line control according to the first example may calculate a distance CR1 from the virtual curve line L1 to the vehicle 1 to calculate, for example, the lateral position of the vehicle 1 and the target lateral position on the basis of the distance CR1 instead of the distance CR. The one-side-lane-line control according to the first example may be executable in a case where it is possible to estimate the own vehicle position on the road map by the locator unit 15.

Figure 7:
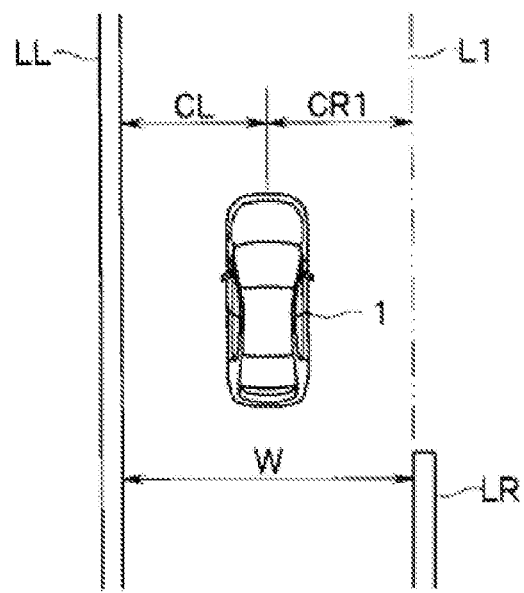
FIG. 7 is a diagram illustrating another example of the one-side-lane-line control according to one example embodiment of the technology.

FIG. 7 is a diagram illustrating a second example of the one-side-lane-line control. The one-side-lane-line control according to the second example may be basically the same as that according to the first example. However, the lane keep processor 32 in the one-side-lane-line control according to the second example may acquire the data on the width W of the lane calculated on the basis of the right and the left lane lines detected in the past. In some embodiments, the data on the width W of the lane may be stored in an unillustrated storage provided in the automatic steering control unit 11 or any other control unit. The storage may be any storage such as RAM. The one-side-lane-line control according to the second example may be executable in a case where the both-side-lane-line control has been executed previously and where the data on the width W of the lane has been stored in the storage.

Figure 8:
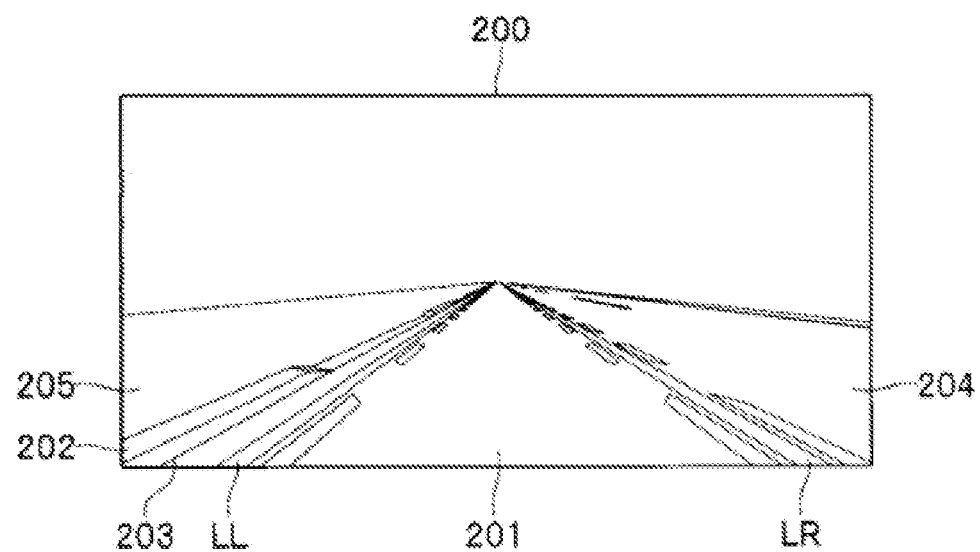
FIG. 8 is a diagram illustrating an example of an image of a traveling environment according to one example embodiment of the technology.
Figure 9:
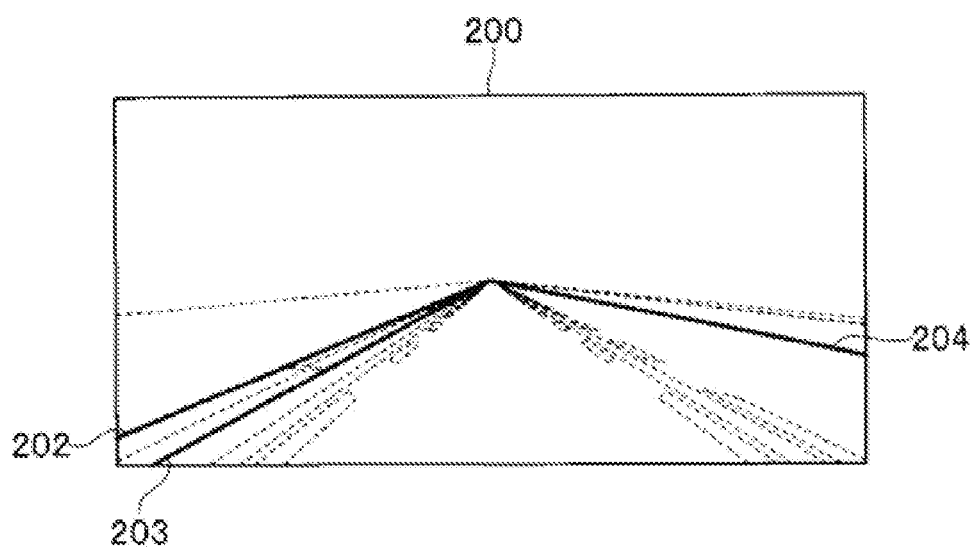
FIG. 9 is a diagram illustrating an example of shape data according to one example embodiment of the technology.

Described now, with reference to FIGS. 8 and 9, is the shape data. FIG. 8 is a diagram illustrating an example of an image of a traveling environment. FIG. 9 is a diagram illustrating an example of the shape data. FIG. 8 illustrates an example of an image 200 containing: a lane 201 along which the vehicle 1 travels; a curbstone 202 that is adjacent to the lane 201; a road end 203 of a road that includes the lane 201; an adjacent lane 204 that is adjacent to the lane 201; and a sidewalk 205. The image 200 may also contain the left lane line LL that defines the lane 201 and the right lane line LR that defines the lane 201.

The shape data detector 25 may extract the curbstone 202, the road end 203, and the adjacent lane 204 from the image 200 illustrated in FIG. 8. The shape data detector 25 may detect the curbstone 202, the road end 203, and the adjacent lane 204 as the data having a corresponding relationship with the road shape of the lane 201. It should be noted that thick lines denoted by reference numerals 202, 203, and 204 may represent the curbstone 202, the road end 203, and the adjacent lane 204 thus extracted.

The shape data detector 25 may calculate a curvature of each of the curbstone 202, the road end 203, and the adjacent lane 204 thus extracted. A method of calculating those curvatures may be the same as the method of calculating the curvatures of the right and the left lane lines (i.e., the curvatures of the right and the left inner edges) performed by the lane line detector 24, for example.

Figure 10:
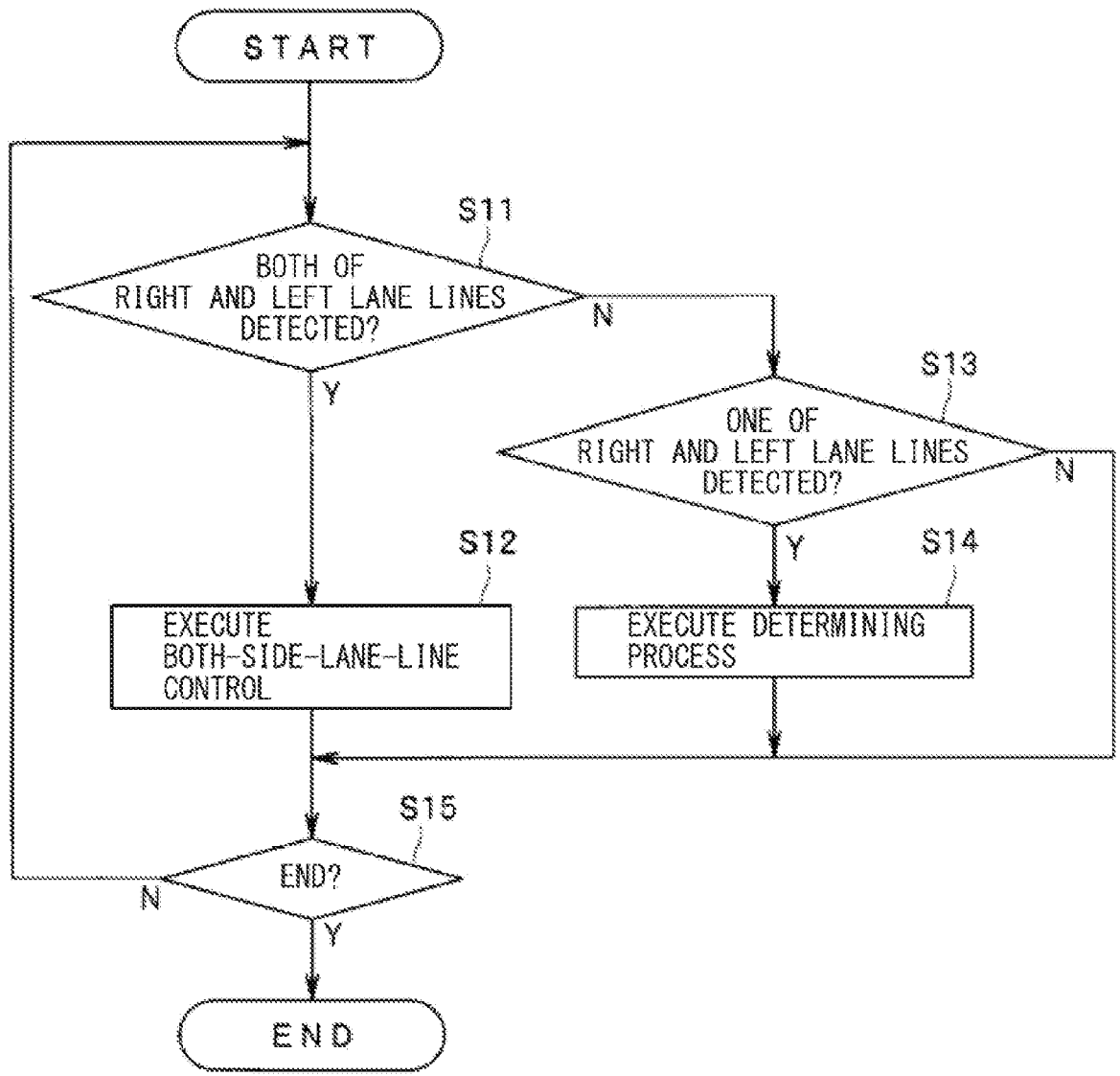
FIG. 10 is a flowchart illustrating an execution determining process of an automatic steering control according to one example embodiment of the technology.

A description is given next of an example of an operation of the automatic steering control apparatus 100. Described first, with reference to FIG. 10, is an execution determining process of the automatic steering control. FIG. 10 is a flowchart illustrating the execution determining process of the automatic steering control. First, in the execution determining process illustrated by way of example in FIG. 10, the determining unit 31 of the automatic steering control unit 11 may acquire the data from the lane line detector 24 of the camera unit 21 to determine whether both of the right and the left lane lines are detected (step S11). If both of the right and the left lane lines are detected (step S11: Y), the lane keep processor 32 of the automatic steering control unit 11 may execute the both-side-lane-line control (step S12).

If both of the right and the left lane lines are not detected in step S11 (step S11: N), the determining unit 31 may determine whether one of the right and the left lane lines is detected (step S13). If one of the right and the left lane lines is detected (step S13: Y), the determining unit 31 may execute a determining process (step S14). It should be noted that the determining process will be described later in greater detail.

If one of the right and the left lane lines is not detected after the execution of step S12, after the execution of step S14, or upon the execution of step S13 (step S13: N), the automatic steering control unit 11 may determine whether to end the automatic steering control such as the lane keep control (step S15). If the automatic steering control unit 11 determines to end the automatic steering control in step S15 (step S15: Y), the automatic steering control unit 11 may end the automatic steering control. If the automatic steering control unit 11 determines not to end the automatic steering control in step S15 (step S15: N), the execution determining process may return to step S11.

Figure 11:
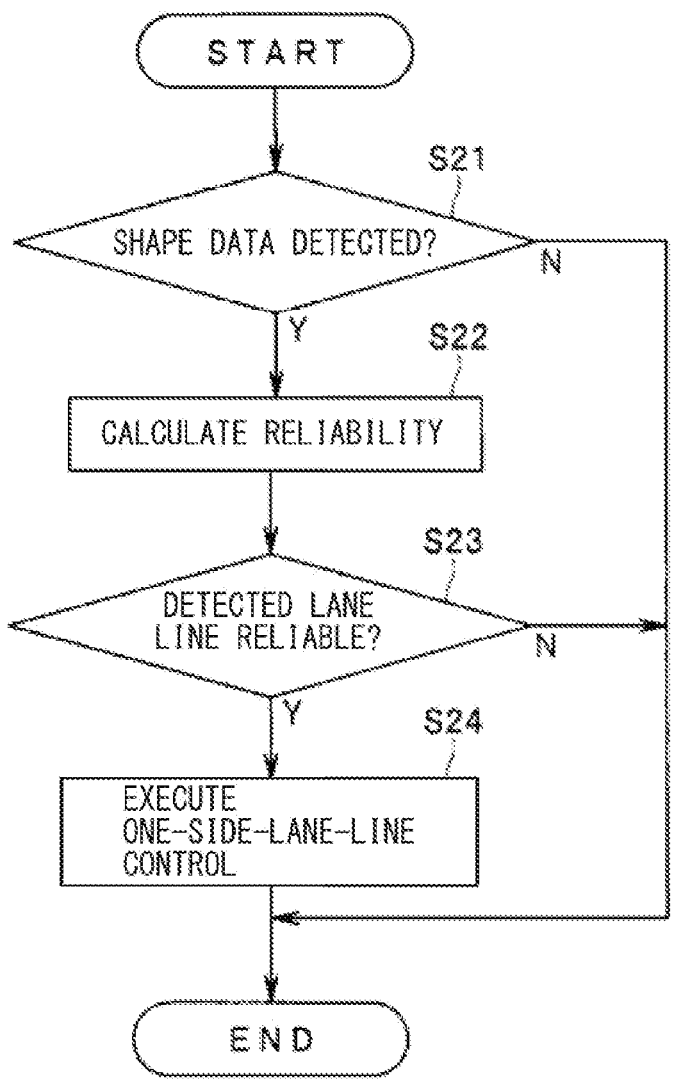
FIG. 11 is a flowchart illustrating a determining process according to one example embodiment of the technology.

Described next, with reference to FIG. 11, is an example of the determining process (step S14) illustrated in FIG. 10. FIG. 11 is a flowchart illustrating the determining process. First, in the determining process, the determining unit 31 may acquire the data from the shape data detector 25 of the camera unit 21 to determine whether the shape data is detected (step S21).

If the shape data is detected in step S21 (step S21: Y), the determining unit 31 may acquire the data on the detected lane line from the lane line detector 24 and the shape data from the shape data detector 25 to calculate a reliability of the detected lane line (step S22). In some embodiments, the reliability may be calculated on the basis of: a curvature or a yaw angle of the detected lane line; and a curvature or a yaw angle of one of factors including, for example, the curbstone 202, the road end 203, and the adjacent lane line 204 extracted by the shape data detector 25. In some embodiments, the reliability may be an absolute value of a difference between parameters (a difference between the curvatures or a difference between the yaw angles) corresponding to the respective detected lane line and shape data.

Thereafter, the determining unit 31 may determine whether the detected lane line is reliable on the basis of the reliability (step S23). In some embodiments where the reliability is the absolute value of the difference between the parameters corresponding to the detected lane line and the shape data, the determining unit 31 may determine that the reliability is high, i.e., the detected lane line is reliable, if the absolute value is relatively small. If the absolute value is relatively large, the determining unit 31 may determine that the reliability is low, i.e., the detected lane line is not reliable.

If the detected lane line is determined as being reliable in step S23 (step S23: Y), the lane keep processor 32 may execute the one-side-lane-line control (step S24). The determining process may end after the execution of step S24, or if the shape data is not detected in step S21 (step S21: N) or if the detected lane line is determined as not being reliable in step S23 (step S23: N).

A description is given next of example workings and example effects of the automatic steering control apparatus 100 according to an example embodiment. In an example embodiment described above, the determining unit 31 executes the determining process that compares the data on the detected lane line and the shape data and that determines whether to execute the one-side-lane-line control, in a case where only one of the right and the left lane lines is detected by the lane line detector 24 as the detected lane line. Thus, according to an example embodiment, it is possible to execute the automatic steering control such as the lane keep control, even in a case where only one of the right and the left lane lines is detected.

In some embodiments, the determining unit 31 may execute the determining process where the automatic steering control such as the lane keep control is not executed. Specifically, it is not possible to identify the width of the lane and determine whether the curvature or the yaw angle of the detected lane line is coincident with a curvature or a yaw angle of the actual lane, in a case where only one of the right and the left lane line is detected upon starting or resuming the automatic steering control such as the lane keep control. In contrast, the determining process described above makes it possible to determine whether the detected lane line is reliable. In some embodiments, the lane keep processor 32 may execute the one-side-lane-line control in a case where the reliability is relatively high where the automatic steering control such as the lane keep control is not executed, and may refrain from executing the one-side-lane-line control in a case where the reliability is relatively low where the automatic steering control such as the lane keep control is not executed. Thus, according to some embodiments, it is possible to start or resume the automatic steering control such as the lane keep control, even in a case where only one of the right and the left lane lines is detected.

In some embodiments, the one-side-lane-line control, i.e., the one-side-lane-line control according to the first example, may be executed on the basis of the data on the detected lane line and the data on the width of the lane acquired by the lane width acquiring unit 17A. Thus, according to some embodiments, it is possible to execute the one-side-lane-line control even in a case where only one of the right and the left lane lines is detected upon, in particular, starting or resuming the automatic steering control such as the lane keep control.

In some embodiments, the determining process described above may be performed in a case where only one of the right and the left lane lines is detected as the detected lane line where the both-side-lane-line control is executed. In some embodiments, the one-side-lane-line control may be executed without performing the determining process, in a case where only one of the right and the left lane lines is detected as the detected lane line where the both-side-lane-line control is executed. In these cases, in some embodiments, the one-side-lane-line control according to the second example may be executed.

Figure 12:
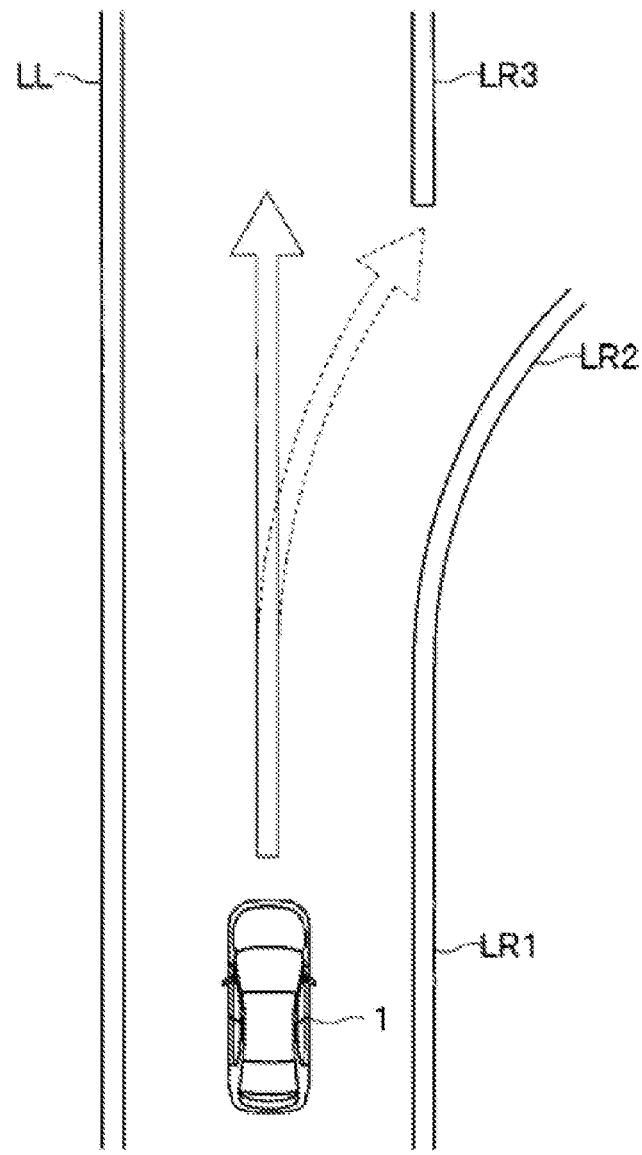
FIG. 12 is a diagram illustrating a switching process according to one example embodiment of the technology.

A description is given next of a second example embodiment of the technology. In the second example embodiment, the automatic steering control unit 11 may execute a switching process that discontinues the both-side-lane-line control and that executes the one-side-lane-line control, in a case where a predetermined condition is satisfied. Described hereinafter, with reference to FIG. 12, is an example of the switching process. FIG. 12 is a diagram illustrating the switching process. FIG. 12 illustrates an example in which a right-turn lane or a branch lane is present on a right side in a forward direction of a lane along which the vehicle 1 travels.

The both-side-lane-line control may be executed on the basis of the parameters including, for example, the lateral position of the vehicle 1, the target lateral position, the lane curvature, and the to-lane yaw angle calculated on the basis of the left lane line LL and a right lane line LR1, before the right-turn lane or the branch lane. When the vehicle 1 approaches the right-turn lane or the branch lane, a lane line LR2 of the right-turn lane or the branch lane can be detected as a right lane line. In this case, a calculation of the parameters described above on the basis of the left lane line LL and the lane line LR2 can cause a shift of the target lateral position from the original target lateral position (e.g., the middle of the lane) due to the lane line LR2, in a case where the lane keep control is executed. This in turn results in a shift of a traveling direction of the vehicle 1 as denoted by a broken line arrow illustrated in FIG. 12.

In the second example embodiment, the automatic steering control unit 11 may execute the switching process that discontinues the both-side-lane-line control and that executes the one-side-lane-line control upon approaching the right-turn lane or the branch lane, in order to prevent the vehicle 1 from being shifted as described above during the execution of the lane keep control. It should be appreciated that it is possible to estimate, as the lane line LR2 of the right-turn lane or the branch lane, the lane line having a larger curvature between the right and the left lane lines. Accordingly, in some embodiments, the one-side-lane-line control may be executed on the basis of the left lane line LL having the smaller curvature between the right and the left lane lines for the lane keep control. Thus, it is possible to execute the lane keep control without involving the shift of the traveling direction of the vehicle 1 as denoted by a solid line arrow illustrated in FIG. 12.

In some embodiments, the lane keep processor 32 of the automatic steering control unit 11 may discontinue the one-side-lane-line control and execute the both-side-lane-line control, in a case where a right lane line LR3 is detected after passing the right-turn lane or the branch lane.

It should be appreciated that the above description applies to a case where a left-turn lane or the branch lane is present on a left side in a forward direction of a lane along which the vehicle 1 travels.

It should also be appreciated that the one-side-lane-line control may be based on the first example or the second example as described above in the first example embodiment. In some embodiments, the one-side-lane-line control to be executed by the switching process may be based on the first example. In some embodiments, the one-side-lane-line control to be executed by the switching process may be based on the second example.

Figure 13:
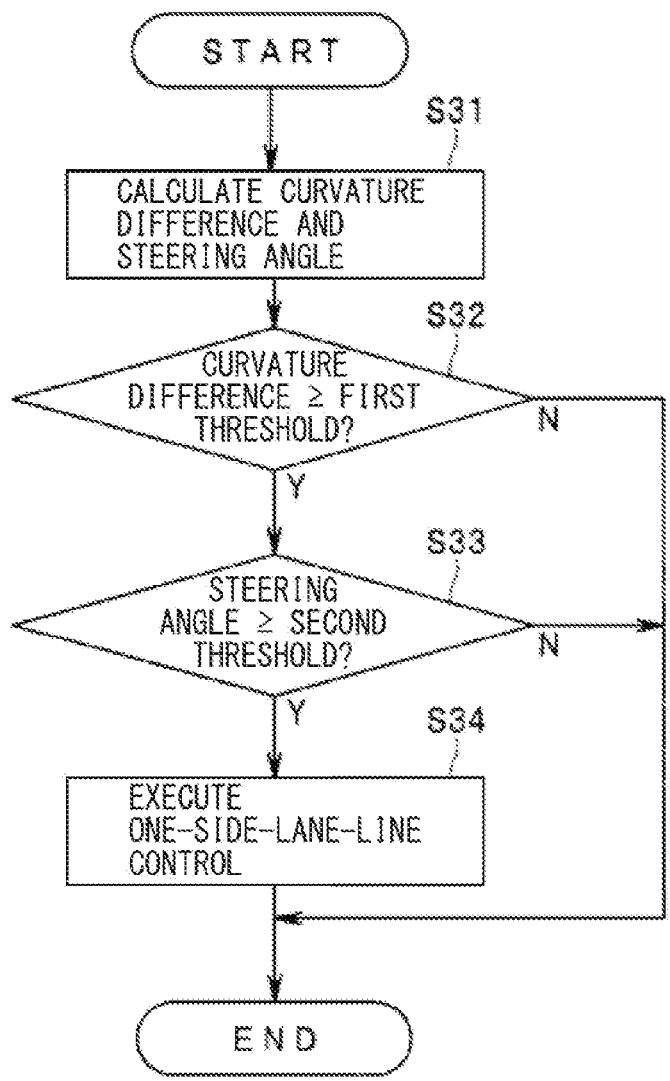
FIG. 13 is a flowchart illustrating the switching process according to one example embodiment of the technology.

A description is given next, with reference to FIG. 4 of the first example embodiment and FIG. 13, an example of an operation of the automatic steering control apparatus 100 related to the switching process. FIG. 13 is a flowchart illustrating the switching process. The switching process illustrated by way of example in FIG. 13 may be executed at a predetermined interval during the execution of the both-side-lane-line control.

In the switching process, first, the determining unit 31 of the automatic steering control unit 11 may acquire data from the lane line detector 24 of the camera unit 21 to calculate a difference between curvatures of the respective right and left lane lines (hereinafter referred to as a "curvature difference"), and may acquire the vehicle speed from the vehicle speed sensor 14A to calculate a steering angle on the basis of the curvatures of the respective right and left lane lines and the vehicle speed (step S31). The steering angle to be calculated by the determining unit 31 may be a difference between the target steering angle and a current actual steering angle.

Thereafter, the determining unit 31 may determine whether the curvature difference is equal to or greater than a first threshold (step S32). It should be noted that a sign of the curvature difference is positive. If the curvature difference is equal to or greater than the first threshold (step S32: Y), the determining unit 31 may determine whether the steering angle is equal to or greater than a second threshold (step S33). It should be noted that the steering angle has a positive value. If the steering angle is equal to or greater than the second threshold (step S33: Y), the lane keep processor 32 of the automatic steering control unit 11 may discontinue the both-side-lane-line control and execute the one-side-lane-line control (step S34).

The switching process may end after the execution of step S34, or if the curvature difference is less than the first threshold in step S32 (step S32: N) or if the steering angle is less than the second threshold in step S33 (step S33: N).

The second example embodiment described above may use the steering angle for the switching process. Thus, according to the second example embodiment, it is possible to execute the one-side-lane-line control before the steering angle changes to some extent.

It is to be appreciated that the steering angle changes depending on the vehicle speed. Accordingly, in other words, the second example embodiment may vary a timing of executing the one-side-lane-line control in response to the vehicle speed. According to the second example embodiment, it is possible to prevent a delay in timing of executing the switching from the both-side-lane-line control to the one-side-lane-line control, especially in a case where the vehicle speed is relatively high.

Other configurations, workings, and effects according to the second example embodiment may be similar to those according to the first example embodiment described above.

Figure 14:
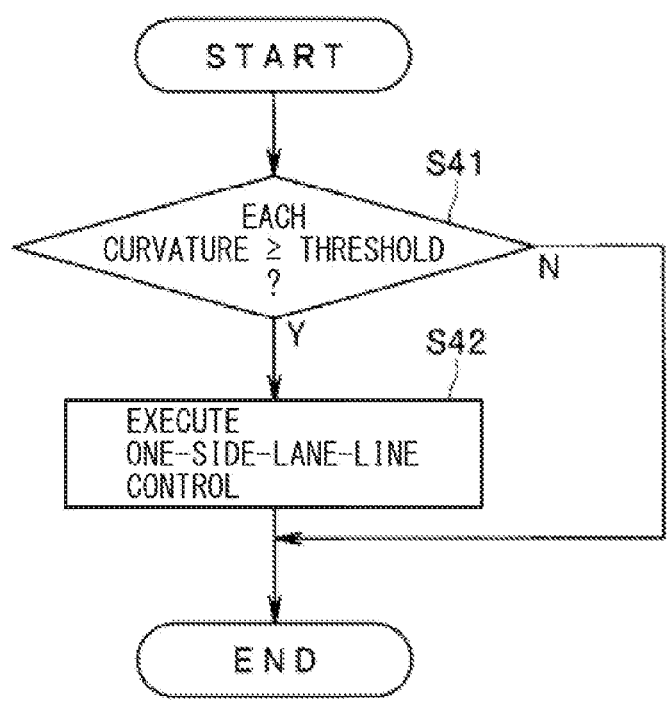
FIG. 14 is a flowchart illustrating a switching process according to one example embodiment of the technology.

A description is given next of a third example embodiment of the technology. The third example embodiment differs from the second example embodiment described above in content of the switching process. Described hereinafter, with reference to FIG. 4 of the first example embodiment and FIG. 14, is an example of an operation of the automatic steering control apparatus 100 related to the switching process according to the third example embodiment. FIG. 14 is a flowchart illustrating the switching process. The switching process illustrated by way of example in FIG. 14 may be executed at a predetermined interval during the execution of the both-side-lane-line control.

In the switching process according to the third example embodiment, the determining unit 31 of the automatic steering control unit 11 may acquire data on the curvatures of the respective right and left lane lines from the lane line detector 24 of the camera unit 21 to determine whether the curvatures are each equal to or greater than a predetermined threshold (step S41). It should be noted that the curvatures each have a positive value. For example, in the third example embodiment, the curvatures each may be calculated on the basis of data on points that serve as candidates of a lane line within a predetermined region. Alternatively, the curvatures each may be a resultant of a calculation that involves shifting of the predetermined region described above by a predetermined distance. The predetermined distance may be shorter than the predetermined region.

If one of the curvatures is equal to or greater than the threshold in step S41 (step S41: Y), the lane keep processor 32 of the automatic steering control unit 11 may discontinue the both-side-lane-line control and execute the one-side-lane-line control (step S42).

The switching process may end after the execution of step S42 or if each of the curvatures is less than the threshold in step S41 (step S41: N).

Other configurations, workings, and effects according to the third example embodiment may be similar to those according to the second example embodiment described above.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the automatic steering control according to at least one embodiment of the technology may be any control other than the lane keep control, such as a lane departure prevention control.

The lane line detector 24 and the shape data detector 25 illustrated in FIGS. 3 and 4 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the lane line detector 24 and the shape data detector 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the lane line detector 24 and the shape data detector 25 illustrated in FIGS. 3 and 4.

The invention claimed is:

1. An automatic steering control apparatus configured to perform an automatic steering control that causes a vehicle to travel along a target traveling path, the automatic steering control apparatus comprising:
a lane line detector configured to detect right and left lane lines that define a lane along which the vehicle travels;

a shape data detector configured to detect shape data, the shape data having a corresponding relationship with a road shape of the lane and excluding the right and the left lane lines;
a traveling processor configured to execute a traveling control that controls a traveling state of the vehicle; and
a steering angle processor configured to control a steering angle of the vehicle on a basis of a command signal from the traveling processor, wherein
the traveling processor is configured to, in a case where both the right and the left lane lines are detected by the lane line detector, execute a first lane-line control, the first lane-line control being the automatic steering control to be executed on a basis of both the right and the left lane lines,
the traveling processor is configured to, in a case where only one of the right and the left lane lines is detected by the lane line detector as a detected lane line, execute a determining process that compares data on the detected lane line and the shape data and that determines whether to execute a second lane-line control, the second lane-line control being the automatic steering control to be executed on a basis of only the one of the right and the left lane lines,
the automatic steering control comprises a lane keep control that keeps the vehicle within the lane, and
the traveling processor is configured to discontinue the first lane-line control and execute the second lane-line control, in a case where the first lane-line control is executed and a curvature of one of the right and the left lane lines is equal to or greater than a first threshold.

2. The automatic steering control apparatus according to claim 1, wherein the traveling processor is configured to execute the determining process in a case where the automatic steering control is not executed.

3. The automatic steering control apparatus according to claim 2, wherein the traveling processor is configured to calculate a reliability of the detected lane line on a basis of the data on the detected lane line and the shape data, and execute the determining process on a basis of the reliability.

4. The automatic steering control apparatus according to claim 3, wherein the traveling processor is configured to
execute the second lane-line control in a case where the reliability is relatively high and the automatic steering control is not executed, and
refrain from executing the second lane-line control in a case where the reliability is relatively low and the automatic steering control is not executed.

5. The automatic steering control apparatus according to claim 1, wherein the traveling processor is configured to calculate a reliability of the detected lane line on a basis of the data on the detected lane line and the shape data, and execute the determining process on a basis of the reliability.

6. The automatic steering control apparatus according to claim 5, wherein the traveling processor is configured to
execute the second lane-line control in a case where the reliability is relatively high and the automatic steering control is not executed, and
refrain from executing the second lane-line control in a case where the reliability is relatively low and the automatic steering control is not executed.

7. The automatic steering control apparatus according to claim 1, wherein the shape data comprises data on an element extending along the lane.

8. The automatic steering control apparatus according to claim 7, wherein the shape data comprises one or more of: data on a curbstone that is adjacent to the lane; data on a road end of a road that includes the lane; and data having a corresponding relationship with an adjacent lane that is adjacent to the lane.

9. The automatic steering control apparatus according to claim 1, further comprising a lane width acquiring unit configured to acquire data on a width of the lane, wherein the traveling processor is configured to execute the second lane-line control on a basis of the data on the detected lane line and the data on the width of the lane.

10. The automatic steering control apparatus according to claim 1, wherein the traveling processor is configured to execute the second lane-line control on a basis of the right lane line or the left lane line, whichever has a smaller curvature.

11. An automatic steering control apparatus configured to perform an automatic steering control that causes a vehicle to travel along a target traveling path, the automatic steering control apparatus comprising:
a lane line detector configured to detect right and left lane lines that define a lane along which the vehicle travels;
a shape data detector configured to detect shape data, the shape data having a corresponding relationship with a road shape of the lane and excluding the right and the left lane lines;
a traveling processor configured to execute a traveling control that controls a traveling state of the vehicle;
a steering angle processor configured to control a steering angle of the vehicle on a basis of a command signal from the traveling processor; and
a traveling state detector configured to detect a vehicle speed of the vehicle as data on the traveling state of the vehicle, wherein
the traveling processor is configured to, in a case where both the right and the left lane lines are detected by the lane line detector, execute a first lane-line control, the first lane-line control being the automatic steering control to be executed on a basis of both the right and the left lane lines,
the traveling processor is configured to, in a case where only one of the right and the left lane lines is detected by the lane line detector as a detected lane line, execute a determining process that compares data on the detected lane line and the shape data and that determines whether to execute a second lane-line control, the second lane-line control being the automatic steering control to be executed on a basis of only the one of the right and the left lane lines,
the automatic steering control comprises a lane keep control that keeps the vehicle within the lane,
the traveling processor is configured to calculate, in a case where the first lane-line control is executed, the steering angle on a basis of a curvature of each of the right and left lane lines and the vehicle speed, and
the traveling processor is configured to discontinue the first lane-line control and execute the second lane-line control, in a case where a difference between the curvatures of the respective right and left lane lines is equal to or greater than a first threshold and the steering angle is equal to or greater than a second threshold.

12. The automatic steering control apparatus according to claim 11, wherein the traveling processor is configured to execute the second lane-line control on a basis of one of the right and the left lane lines, the one of the right and the left lane lines having the smaller curvature between the right and the left lane lines.

13. An automatic steering control apparatus configured to perform an automatic steering control that causes a vehicle to travel along a target traveling path, the automatic steering control apparatus comprising:

circuitry configured to
- detect right and left lane lines that define a lane along which the vehicle travels, and
- detect shape data, the shape data having a corresponding relationship with a road shape of the lane and excluding the right and the left lane lines;

a traveling processor configured to execute a traveling control that controls a traveling state of the vehicle; and a steering angle processor configured to control a steering angle of the vehicle on a basis of a command signal from the traveling processor, wherein the traveling processor is configured to, in a case where both the right and the left lane lines are detected by the circuitry, execute a first lane-line control, the first lane-line control being the automatic steering control to be executed on a basis of both the right and the left lane lines, the traveling processor is configured to, in a case where only one of the right and the left lane lines is detected by the circuitry as a detected lane line, execute a determining process that compares data on the detected lane line and the shape data and that determines whether to execute a second lane-line control, the second lane-line control being the automatic steering control to be executed on a basis of only the one of the right and the left lane lines, the automatic steering control comprises a lane keep control that keeps the vehicle within the lane, and the traveling processor is configured to discontinue the first lane-line control and execute the second lane-line control, in a case where the first lane-line control is executed and a curvature of one of the right and the left lane lines is equal to or greater than a first threshold.

14. An automatic steering control apparatus configured to perform an automatic steering control that causes a vehicle to travel along a target traveling path, the automatic steering control apparatus comprising:

circuitry configured to
- detect right and left lane lines that define a lane along which the vehicle travels, and
- detect shape data, the shape data having a corresponding relationship with a road shape of the lane and excluding the right and the left lane lines;

a traveling processor configured to execute a traveling control that controls a traveling state of the vehicle;

a steering angle processor configured to control a steering angle of the vehicle on a basis of a command signal from the traveling processor; and a traveling state detector configured to detect a vehicle speed of the vehicle as data on the traveling state of the vehicle, wherein the traveling processor is configured to, in a case where both the right and the left lane lines are detected by the circuitry, execute a first lane-line control, the first lane-line control being the automatic steering control to be executed on a basis of both the right and the left lane lines, the traveling processor is configured to, in a case where only one of the right and the left lane lines is detected by the circuitry as a detected lane line, execute a determining process that compares data on the detected lane line and the shape data and that determines whether to execute a second lane-line control, the second lane-line control being the automatic steering control to be executed on a basis of only the one of the right and the left lane lines, the automatic steering control comprises a lane keep control that keeps the vehicle within the lane, the traveling processor is configured to calculate, in a case where the first lane-line control is executed, the steering angle on a basis of a curvature of each of the right and left lane lines and the vehicle speed, and the traveling processor is configured to discontinue the first lane-line control and execute the second lane-line control, in a case where a difference between the curvatures of the respective right and left lane lines is equal to or greater than a first threshold and the steering angle is equal to or greater than a second threshold.

* * * * *